(12) United States Patent
Oya

(10) Patent No.: US 11,750,765 B2
(45) Date of Patent: Sep. 5, 2023

(54) PERFORMING COLOR CONVERSION THAT ACQUIRES A SAMPLE COLOR INCLUDED IN SECOND IMAGE DATA

(71) Applicant: CANON KABUSHIKI KAISHA, Tokyo (JP)

(72) Inventor: Masashi Oya, Soka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/814,479

(22) Filed: Jul. 22, 2022

(65) Prior Publication Data

US 2022/0360688 A1 Nov. 10, 2022

Related U.S. Application Data

(63) Continuation of application No. 16/904,402, filed on Jun. 17, 2020, now Pat. No. 11,431,878.

(30) Foreign Application Priority Data

Jun. 18, 2019 (JP) .................................. 2019-113205

(51) Int. Cl.
*H04N 1/60* (2006.01)

(52) U.S. Cl.
CPC ......... *H04N 1/6072* (2013.01); *H04N 1/6019* (2013.01); *H04N 1/6027* (2013.01); *H04N 1/6097* (2013.01)

(58) Field of Classification Search
CPC .. H04N 1/6072; H04N 1/6097; H04N 1/6019; H04N 1/6027; H04N 1/6013; H04N 1/6033
See application file for complete search history.

(56) References Cited

U.S. PATENT DOCUMENTS

| | | | |
|---|---|---|---|
| 2017/0280023 A1* | 9/2017 | Kobayashi | H04N 1/00023 |
| 2019/0037111 A1* | 1/2019 | Ezoe | H04N 1/6008 |
| 2020/0267285 A1* | 8/2020 | Hioki | B41J 29/393 |

FOREIGN PATENT DOCUMENTS

JP 2011114717 A 6/2011

* cited by examiner

*Primary Examiner* — Christopher Wait
(74) *Attorney, Agent, or Firm* — Canon U.S.A., Inc. IP Division

(57) ABSTRACT

In a case where a sample color is outside a color reproduction range of an image forming apparatus, there arises an issue that an adjustment target color cannot be brought close to a user-desired color. An image forming apparatus includes a generation unit configured to cause a printing unit to print a plurality of colors close to an acquired sample color and generate a color conversion table based on a user-selected color among the plurality of printed colors in a case where it is determined that the acquired sample color is outside a color reproduction range of the image forming apparatus, whereas in a case where it is determined that the acquired sample color is not outside the color reproduction range, the generation unit generates a color conversion table without causing the printing unit to print the plurality of colors close to the sample color.

12 Claims, 12 Drawing Sheets

PERFORMING COLOR CONVERSION THAT ACQUIRES A SAMPLE COLOR INCLUDED IN SECOND IMAGE DATA

CROSS REFERENCE TO RELATED APPLICATIONS

The present application is a continuation of U.S. patent application Ser. No. 16/904,402, filed on Jun. 17, 2020, which claims priority from Japanese Patent Application No. 2019-113205, filed Jun. 18, 2019, each of which are hereby incorporated by reference herein in their entirety.

BACKGROUND

Field

The present disclosure relates to an image processing apparatus and an image forming apparatus with which a user possessing a sample performs color adjustment.

Description of the Related Art

In recent years, performance of electrophotographic digital apparatuses has improved, and there has been an apparatus that realizes image quality close to conventional analog plate-printing machines. The advent of an electrophotographic digital apparatus that realizes image quality close to that of a conventional analog plate-printing machine at low cost made it possible to print materials such as a point-of-purchase (POP) advertisement for use in a store with ease in the store. POP is the abbreviation for "point-of-purchase advertising" and refers to an advertisement used for sales promotion. Due to a difference in printing apparatuses or a difference in printing timing, a POP advertisement is sometimes printed in different colors from those of a sample POP advertisement. In such a case, conventionally, a serviceman with expert knowledge adjusted the apparatus to match the colors, but in recent years, a method by which a store staff can easily adjust colors without any special knowledge is discussed (Japanese Patent Application Laid-Open No. 2017-22648). For example, a color (hereinafter, "adjustment target color") to be adjusted is extracted from image data on a printing target image such as a POP advertisement. Further, a printed material for use as a sample is read by a sensor, and a user selects a color (hereinafter, "sample color") to be used as an adjustment target color from the read image data (hereinafter, "sample image"). Then, a target signal value for the reproduction of the selected color is identified, taking into consideration the color reproduction characteristics of an image forming apparatus used for printing a POP advertisement. A color conversion table is adjusted so that when an adjustment target color is input, the input adjustment target color is converted into the target signal value corresponding to the sample color.

SUMMARY

The technique discussed in Japanese Patent Application Laid-Open No. 2017-22648 has some issues. One of the issues is that in a case where the sample color is outside a color reproduction range of the image forming apparatus, the adjustment target color cannot be brought close to a user-desired color.

In consideration of the above-discussed points, according to an aspect of the present disclosure, an image forming apparatus includes an acquisition unit configured to acquire a sample color contained in a sample image, a determination unit configured to determine whether the acquired sample color is outside a color reproduction range of the image forming apparatus, and a generation unit configured to cause a printing unit to print a plurality of colors close to the sample color and generate a color conversion table based on a user-selected color among the plurality of printed colors in a case where the determination unit determines that the acquired sample color is outside the color reproduction range of the image forming apparatus, whereas in a case where the determination unit determines that the acquired sample color is not outside the color reproduction range of the image forming apparatus, the generation unit generates a color conversion table without causing the printing unit to print the plurality of colors close to the sample color.

Further features of the present disclosure will become apparent from the following description of exemplary embodiments with reference to the attached drawings.

DESCRIPTION OF THE EMBODIMENTS

Various exemplary embodiments of the present disclosure will be described below with reference to the drawings. It should be noted that the below-described exemplary embodiments are not intended to limit the scope of the claims and that not every combination of features described in the exemplary embodiments is always essential to a technical solution in accordance with the present disclosure.

Color adjustment processing using a sample as described in the exemplary embodiments are widely applicable to image forming apparatuses that perform printing, such as copying machines, laser printers, and inkjet printers, and image display apparatuses, such as monitors and projectors. In the exemplary embodiments, a multi-function peripheral (MFP) that includes scan, print, copy, and transmission functions will be described as an example. In the below-described exemplary embodiments, colors corresponding to a color space of image data are denoted by the alphabetical letters R, G, and B, or L, a, and b. Specifically, R represents a red component in an RGB color space. A relative color space based on a color reproduction range of a device such as a printer engine or scanner unit described below will be referred to as "device-dependent color space". On the other hand, an absolute color space defined by a standard will be referred to as "device-independent color space". Further, color materials to be recorded on a recording medium are respectively denoted by the alphabetical letters C (cyan), M (magenta), Y (yellow), and K (black) as with RGB.

The term "image data" refers to two-dimensional data of a plurality of planes, each plane being a plane for a separate color. For example, image data of an RGB color space refers to data having a layer structure of three two-dimensional planes for each of R, G, and B. Further, using table data that holds values of discrete points in the color spaces, color conversion processing of converting a value into a value that represents the same color in a differently-defined color space and color adjustment processing of adding desired adjustment processing and then converting a color space are performed. Each discrete point in the above-described color spaces is defined as a grid point in the exemplary embodiments. A grid point refers to a single element of RGB or Lab in table data that represents a color space. Details of an example of table data will be described below.

Hardware Configuration of Image Forming Apparatus

Figure 1:
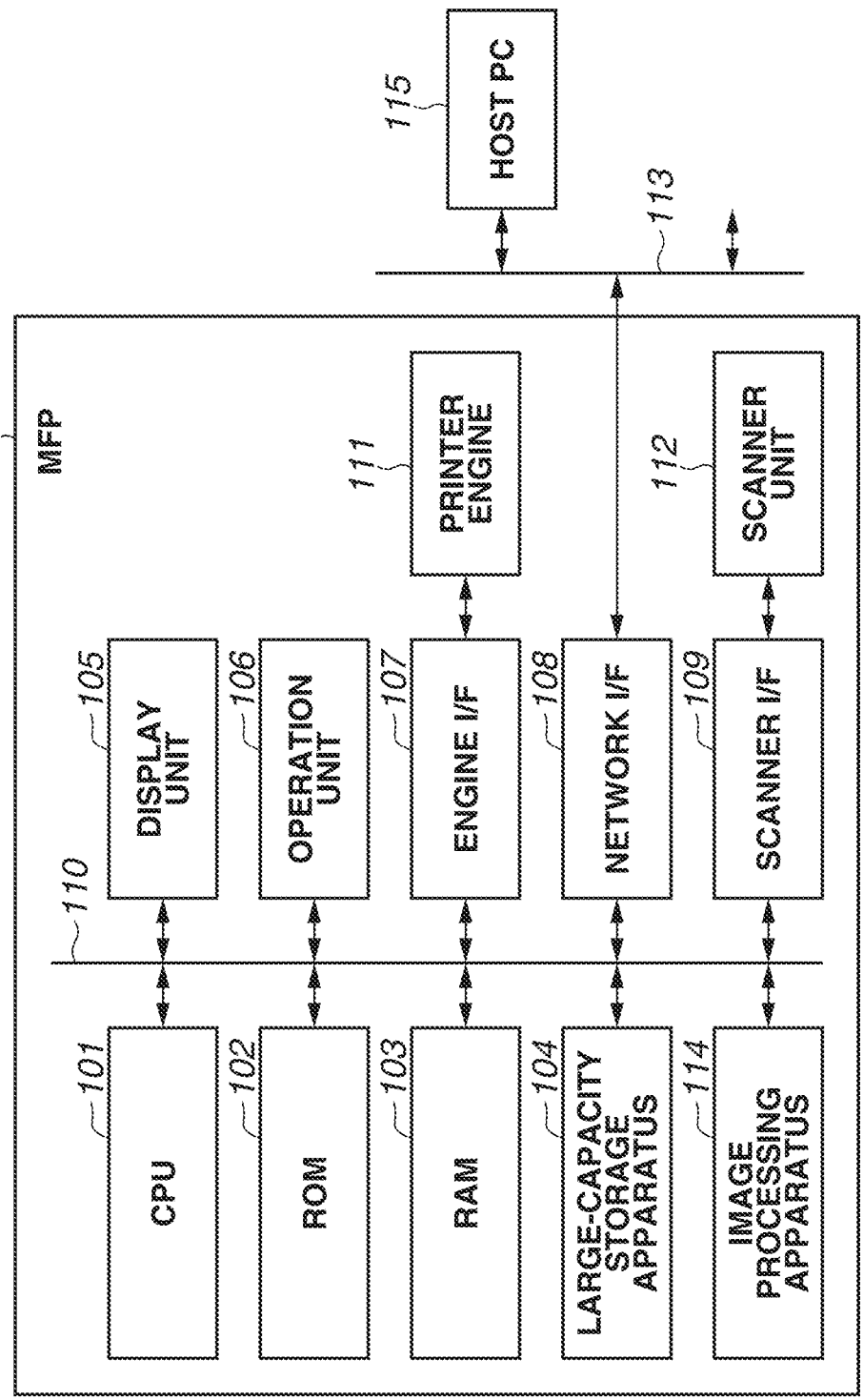
FIG. 1 is a block diagram illustrating a hardware configuration of an image forming apparatus.

FIG. 1 is a block diagram illustrating a hardware configuration of an MFP 100 according to an exemplary embodiment of the present disclosure. The MFP 100 includes a central processing unit (CPU) 101, a read-only memory (ROM) 102, a random access memory (RAM) 103, a large-capacity storage apparatus 104, a display unit 105, an operation unit 106, an engine interface (engine I/F) 107, a network interface (network I/F) 108, a scanner interface (scanner I/F) 109, and an image processing apparatus 114. The components are connected to each other via a system bus 110. The MFP 100 further includes a printer engine 111 and a scanner unit 112. The printer engine 111 and the scanner unit 112 are connected to the system bus 110 via the engine I/F 107 and the scanner I/F 109, respectively. The image processing apparatus 114 can be configured as a separate apparatus from the MFP 100.

The CPU 101 controls operations of the entire MFP 100. The CPU 101 executes various types of processing described below by reading a program stored on the ROM 102 onto the RAM 103 and executing the read program. The ROM 102 is a read-only memory, and a system boot program, a program for printer engine control, text data, and text code information are stored on the ROM 102. The RAM 103 is a non-volatile random access memory and is used as a work area of the CPU 101 and as an area for temporarily storing various types of data. For example, the RAM 103 is used as a storage area for storing font data additionally registered by downloading and image files received from external apparatuses. The large-capacity storage apparatus 104 is, for example, a hard disk drive (HDD) or solid state drive (SSD). Various types of data are spooled to the large-capacity storage apparatus 104, and the large-capacity storage apparatus 104 is used as a storage area for storing programs, information files, and image data or is used as a work area.

The display unit 105 includes, for example, a liquid crystal display (LCD) and is used to display a setting state of the MFP 100, a status of processing in execution, or an error state. The operation unit 106 includes input devices, such as hardware keys and a touch panel situated on the display unit 105, and receives input (instruction) by a user operation. The operation unit 106 is used to change or reset a setting of the MFP 100 and is also used to execute a color adjustment processing mode of the MFP 100 at the time of executing color adjustment processing.

The engine I/F 107 functions as an interface that controls the printer engine 111 based on an instruction from the CPU 101 during execution of printing. Engine control commands are transmitted and received between the CPU 101 and the printer engine 111 via the engine I/F 107. The network I/F 108 functions as an interface for connecting the MFP 100 to a network 113. The network 113 can be, for example, a local area network (LAN) or public switched telephone networks (PSTN). The printer engine 111 forms a multi-color image on a recording medium, such as a sheet, using developer agents (toners) of a plurality of colors (four colors that are cyan, magenta, yellow, and black (CMYK) herein) based on print image data received from the system bus 110. The scanner I/F 109 functions as an interface for controlling the scanner unit 112 based on an instruction from the CPU 101 when the scanner unit 112 reads a document. Scanner unit control commands are transmitted and received between the CPU 101 and the scanner unit 112 via the scanner I/F 109. The scanner unit 112 is controlled by the CPU 101 to read a document image, generate read image data, and transmit the image data to the RAM 103 or the large-capacity storage apparatus 104 via the scanner I/F 109.

Configuration of Image Processing Apparatus

Figure 2:
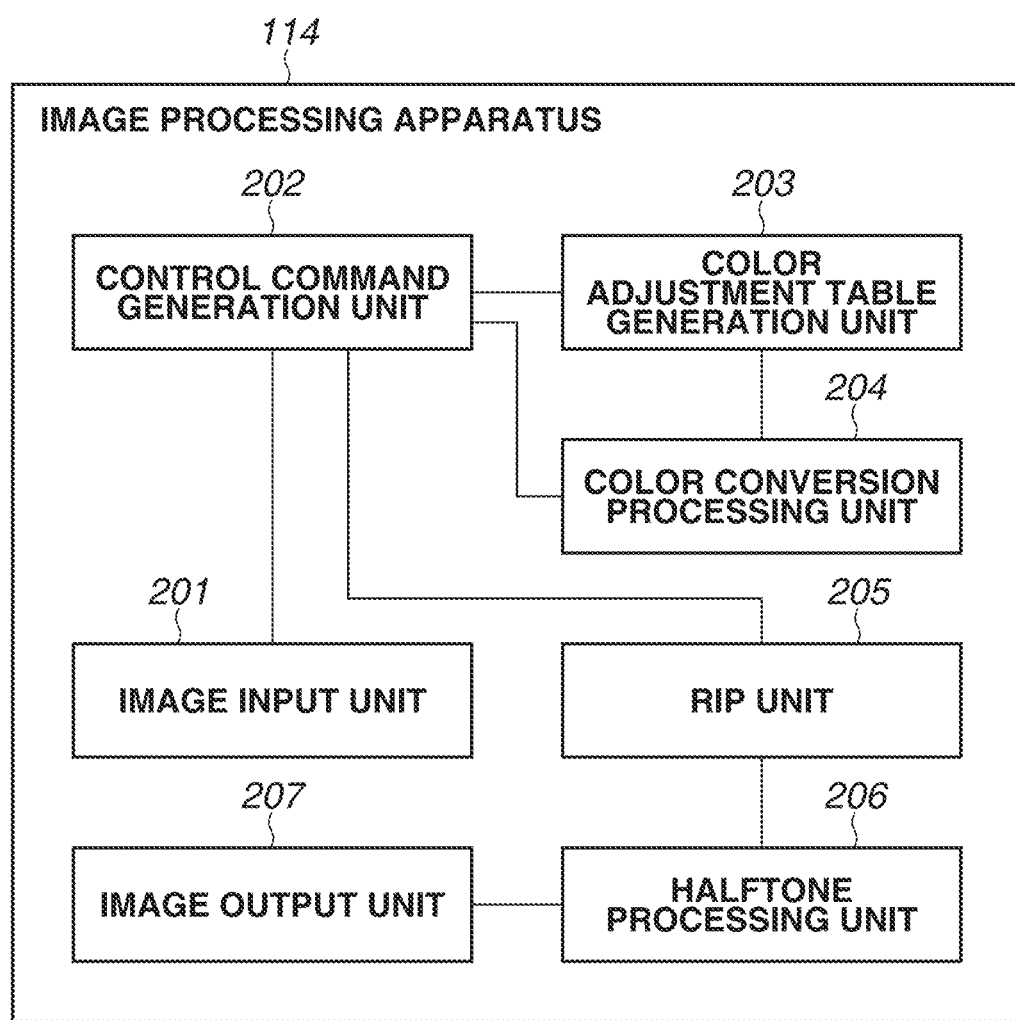
FIG. 2 is a functional block diagram illustrating an internal configuration of an image processing apparatus.

FIG. 2 is a functional block diagram illustrating an internal configuration of the image processing apparatus 114. The image processing apparatus 114 includes an image input unit 201, a control command generation unit 202, a color adjustment table generation unit 203, a color conversion processing unit 204, a raster image processer (hereinafter, "RIP") unit 205, a halftone processing unit 206, and an image output unit 207. The CPU 101 reads a program stored on the ROM 102 onto the RAM 103 and executes the read program to realize each of the functional units.

The image input unit 201 receives input image data to be printed. An example of input image data is image data that is input from a host personal computer (host PC) 115 via the network 113 and the network I/F 108. Image data that is stored on the large-capacity storage apparatus 104 can be input. An example of input image data is three-layer data that represents RGB signals corresponding to standard RGB (sRGB), which is an RGB color space independent of the printer engine 111, in 8-bit 256 gradations. In the present exemplary embodiment, sRGB refers to a standard RGB color space defined by the International Electrotechnical Commission (IEC). The image data input to the image input unit 201 is transmitted to the control command generation unit 202.

The control command generation unit 202 controls the color adjustment table generation unit 203 and the color conversion processing unit 204 and generates a control command for controlling the RIP unit 205 based on the input image data. The RIP unit control command generated by controlling the color adjustment table generation unit 203 and the color conversion processing unit 204 is transmitted to the RIP unit 205.

The color adjustment table generation unit 203 performs an arbitrary color adjustment based on an instruction from the operation unit 106, and then generates color adjustment table data for color conversion of the input image data in the sRGB color space to data in an RGB color space dependent on the printer engine 111 (hereinafter, the RGB color space will be referred to as "devRGB"). In the present exemplary embodiment, by generating the color adjustment table data adjusted to change a color corresponding to an adjustment target color in a color adjustment table to a sample color, color adjustment that brings a color close to a user-desired color becomes possible. Details of a process of generating the color adjustment table will be described below.

The color conversion processing unit 204 performs color conversion processing on RGB values acquired from the control command generation unit 202 to convert the RGB values into values in a CMYK color space using the color adjustment table generated by the color adjustment table generation unit 203 and a color conversion table. The color conversion table is stored on the RAM 103 or the large-capacity storage apparatus 104. First, the color conversion processing unit 204 performs color adjustment on the input image using the color adjustment table generated by the color adjustment table generation unit 203, and then converts the adjusted image into data in the devRGB color space to bring the adjustment target color close to a sample color. Further, color conversion processing is performed using two color conversion tables that are a color conversion table for color conversion from the devRGB color space into a Lab color space and a color conversion table for color conversion from the Lab color space into the CMYK color space to convert the color values into color values in the CMYK color space. In the present exemplary embodiment, Lab refers to a three-dimensional visual uniformity color space defined by the International Commission on Illumination (CIE), which is based on human visual characteristics and independent of the printer engine 111. The color space conversion via the color space independent of the printer engine 111 enables reproduction of a color that is recognized as the same color by a person. A method for color conversion from the devRGB color space to the CMYK color space is not limited to the method that employs the two color conversion tables. For example, the color adjustment table and the two color conversion tables can be combined together to generate a single color conversion table for conversion from the sRGB color space into the CMYK color space, and color conversion processing can be performed using the single color conversion table.

The RIP unit 205 generates a CMYK raster image using a RIP unit control command generated by the control command generation unit 202.

The halftone processing unit 206 performs halftone processing on the CMYK raster image generated by the RIP unit 205. In general, the printer engine 111 can only output fewer gradations, e.g., 2, 4, or 16 gradations, than the input image data that represents 256 gradations. Thus, the halftone processing unit 206 performs halftone processing to enable output with a stable halftone representation even in a case where the number of gradations of the output is small. Various methods such as a density pattern method, a systematic dither method, and an error diffusion method are applicable to the halftone processing by the halftone processing unit 206. The print image data that is processible by the printer engine 111 is generated through the above-described processing.

When the image output unit 207 receives the print image data from the halftone processing unit 206, the image output unit 207 transmits the print image data to the printer engine 111 via the engine I/F 107. The CPU 101 instructs the printer engine 111 to form an image based on the print image data. The printer engine 111 executes exposure, development, transfer, and fixing processes to print a color image on a recording medium based on the input image data.

Configuration of Color Adjustment Table Generation Unit

Figure 3:
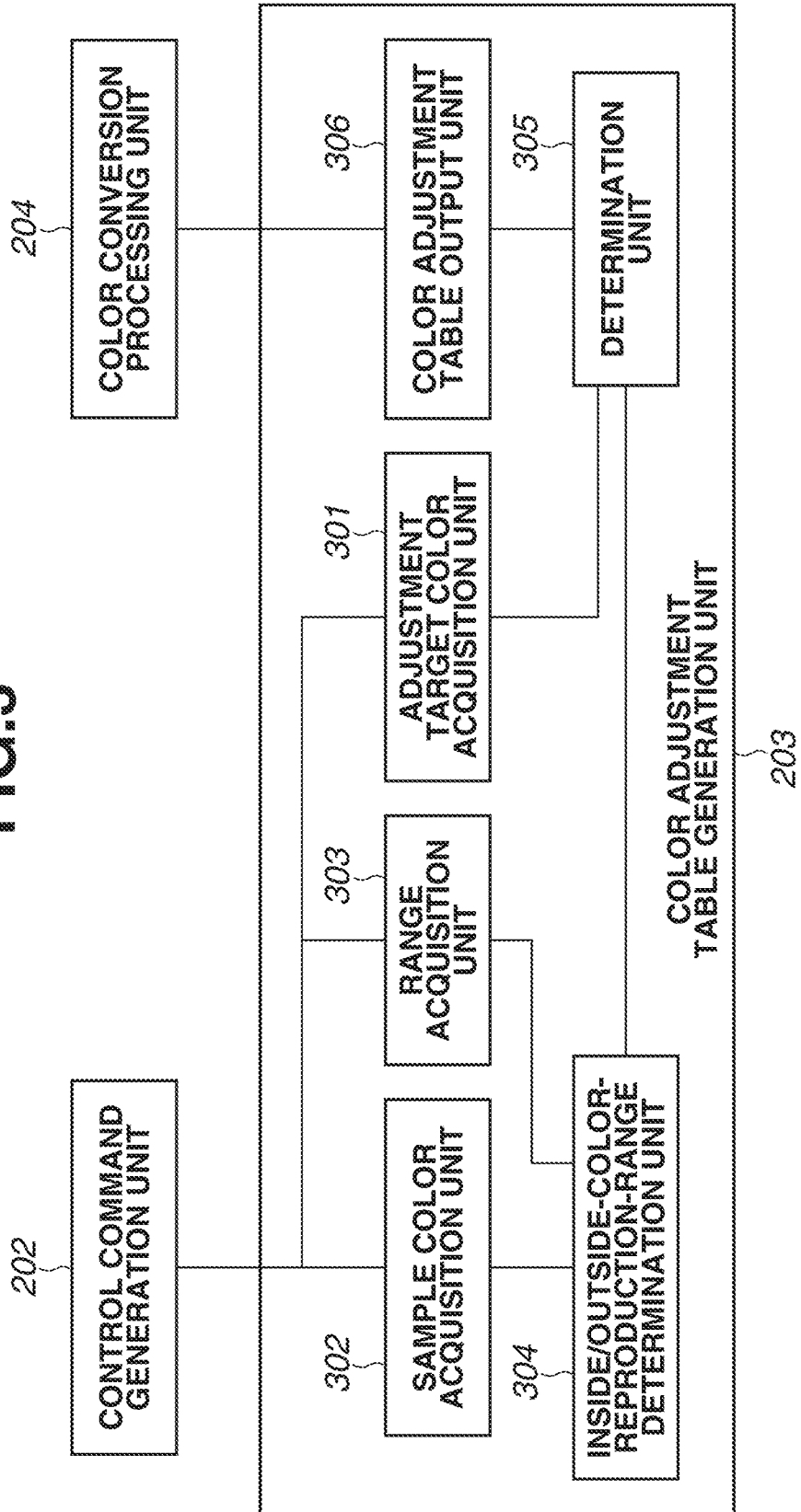
FIG. 3 is a functional block diagram illustrating an internal configuration of a color adjustment table generation unit.

FIG. 3 is a functional block diagram illustrating an internal configuration of the color adjustment table generation unit 203. The color adjustment table generation unit 203 includes an adjustment target color acquisition unit 301, a sample color acquisition unit 302, a range acquisition unit 303, an inside/outside-color-reproduction-range determination unit 304, a determination unit 305, and a color adjustment table output unit 306. The CPU 101 reads a program stored on the ROM 102 onto the RAM 103 and executes the read program to realize the functional units.

Figure 9A:
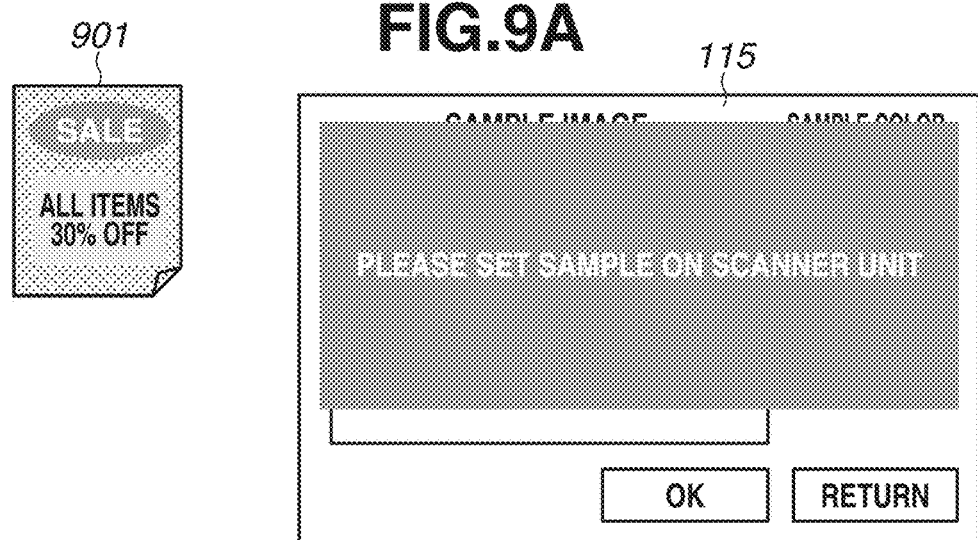
FIG. 9A illustrates an initial state of a UI via which a sample color acquisition unit acquires a sample color.
Figure 9B:
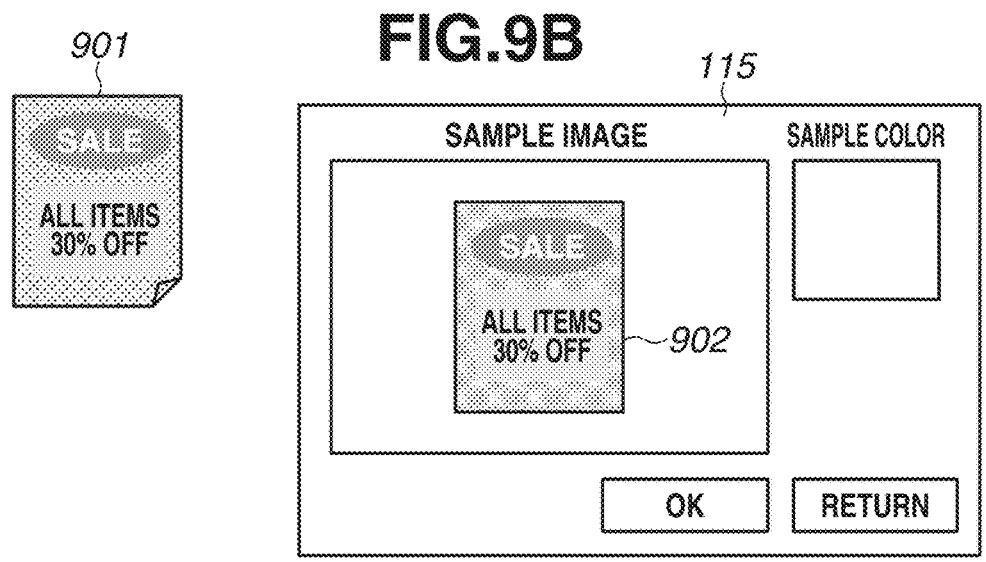
FIG. 9B illustrates a state where a sample is read on the UI via which the sample color acquisition unit acquires a sample color.
Figure 9C:
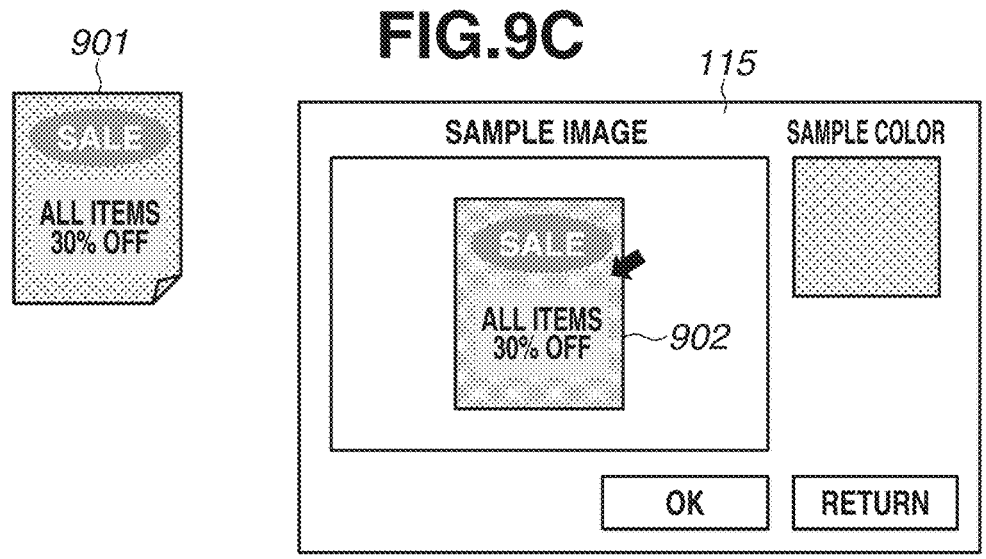
FIG. 9C illustrates a state where a sample color is selected on the UI via which the sample color acquisition unit acquires a sample color.

The sample color acquisition unit 302 acquires a target color (sample color) of an adjustment target color. A process of acquiring the sample color is illustrated in FIGS. 9A to 9C. The sample color acquisition unit 302 displays an instruction to read a sample 901 on the display unit 105 (FIG. 9A). When the user sets a document (sample) containing the sample color on the scanner unit 112, the sample color acquisition unit 302 reads an image of the document via the system bus 110, generates image data, and records the generated image data on the RAM 103. The image data recorded on the RAM 103 is, for example, 8-bit RGB image data. As with the adjustment target color acquisition unit 301, the sample color acquisition unit 302 displays the image data on the display unit 105 (FIG. 9B). A user-selected position in the displayed sample image is displayed as a sample color (FIG. 9C) and acquired as the sample color. The acquired sample color is transmitted to the inside/outside-color-reproduction-range determination unit 304.

The range acquisition unit 303 acquires a color reproduction range of the MFP 100 from the control command generation unit 202. The color reproduction range refers to, for example, a range of colors that the MFP 100 can represent in the Lab space. The color reproduction range is acquired as table data that represents the relationship between the RGB (devRGB) dependent on the printer engine 111 and the Lab corresponding to the RGB (devRGB). Table 1 shows an example of table data that corresponds to the color reproduction range.

TABLE 1

| Input (devRGB) | | | Output | | |
| --- | --- | --- | --- | --- | --- |
| R | G | B | L | A | b |
| 0 | 0 | 0 | 0.0 | 0.0 | 0.0 |
| 0 | 0 | 16 | 0.6 | 3.7 | −13.6 |
| 0 | 0 | 32 | 2.7 | 17.0 | −37.8 |

TABLE 1-continued

| Input (devRGB) | | | Output | | |
|---|---|---|---|---|---|
| R | G | B | L | A | b |
| 0 | 0 | 48 | 6.7 | 33.5 | −55.4 |
| 0 | 0 | 64 | 11.9 | 41.8 | −68.5 |
| 0 | 0 | 80 | 16.8 | 49.2 | −80.7 |
| 0 | 0 | 96 | 21.5 | 56.2 | −92.3 |
| 0 | 0 | 112 | 26.0 | 63.0 | −103.3 |

A color space that is used as the color reproduction range is not limited to the above-described example and can be any color space that is independent of the printer engine 111. For example, a Luv color space defined by CIE, as with the Lab color space, can be used. Lab values are real values in the present exemplary embodiment, and the value of L is 0.0 to 100.0 and the values of a and b are each −127.0 to 128.0. The table data holds values of discrete positions in the RGB color space corresponding to devRGB. In a case where a point for which values are not held is designated, Lab values are calculated from surrounding values by interpolation calculation. The acquired color reproduction range is transmitted to the inside/outside-color-reproduction-range determination unit 304.

The inside/outside-color-reproduction-range determination unit 304 determines whether the Lab values corresponding to the sample color are outside the color reproduction range of the MFP 100 based on the sample color and the color reproduction range. The determination result is transmitted to the determination unit 305.

The determination unit 305 determines target signal values corresponding to the adjustment target color based on the determination result transmitted from the inside/outside-color-reproduction-range determination unit 304. The target signal values are three values R, G, and B of devRGB. In a case where the determination result is not outside the color reproduction range, the Lab values corresponding to the sample color are calculated using the devRGB values that are reproducible by the MFP 100 as the target signal value. On the other hand, in a case where the determination result is outside the color reproduction range, a chart image with a plurality of candidate colors is generated, and the user selects a color similar to a user-desired color from the chart image so that the target signal values are specified. Details of a method for determining the target signal values in the case where the determination result is outside the color reproduction range will be described below in the description of target signal value determination processing (step S404). The determined target signal values are transmitted to the color adjustment table output unit 306.

The color adjustment table output unit 306 generates table data that associates the received adjustment target color with the target signal values, and transmits the generated table data to the color conversion processing unit 204. The color adjustment table is a table that converts input sRGB into the RGB (devRGB) color space that is dependent on the printer engine 111. Table 2 shows an example of the color adjustment table.

TABLE 2

| Input (sRGB) | | | Output(devRGB) | | |
|---|---|---|---|---|---|
| R | G | B | R | G | B |
| 0 | 0 | 0 | 0.0 | 0.0 | 0.0 |
| 0 | 0 | 16 | 0.6 | 3.7 | −13.6 |
| 0 | 0 | 32 | 2.7 | 17.0 | −37.8 |

TABLE 2-continued

| Input (sRGB) | | | Output(devRGB) | | |
|---|---|---|---|---|---|
| R | G | B | R | G | B |
| 0 | 0 | 48 | 6.7 | 33.5 | −55.4 |
| 0 | 0 | 64 | 11.9 | 41.8 | −68.5 |
| 0 | 0 | 80 | 16.8 | 49.2 | −80.7 |
| 0 | 0 | 96 | 21.5 | 56.2 | −92.3 |
| 0 | 0 | 112 | 26.0 | 63.0 | −103.3 |

The devRGB values of a grid point corresponding to the sRGB values of the adjustment target color are replaced by the target signal values. By this replacement processing, a table that adjusts the adjustment target color to a color close to the user-desired color is generated. It is more desirable to perform smoothing processing instead of changing only one grid point so that the difference in output signal values between the grid point specified by the adjustment target color and neighboring grid points in the RGB color space changes smoothly.

Process of Generating Color Adjustment Table

Figure 4:
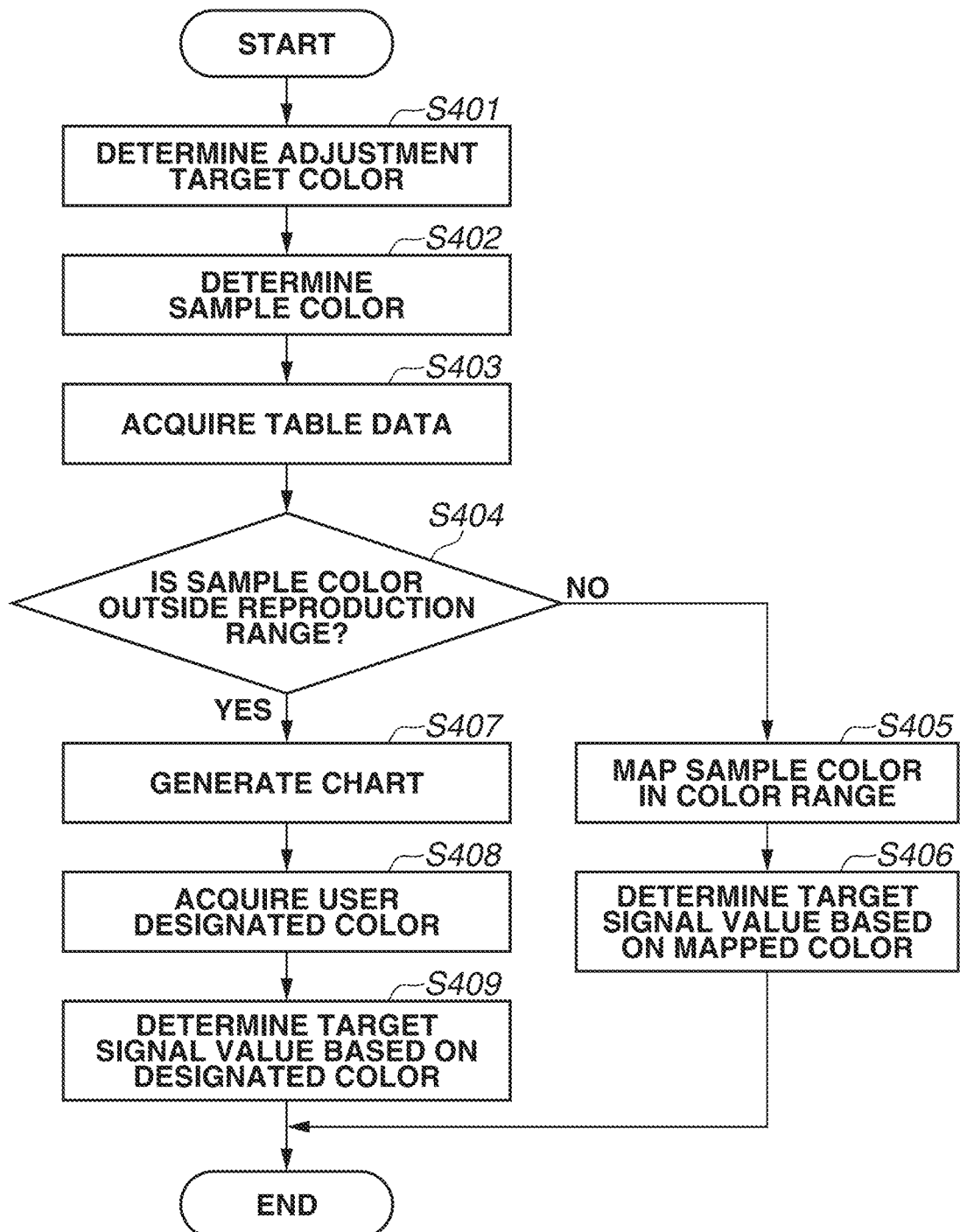
FIG. 4 is a flowchart of a color adjustment table generation unit according to a first exemplary embodiment.

A process of generating the color adjustment table according to the present exemplary embodiment will be described below. FIG. 4 is a flowchart illustrating a process by the color adjustment table generation unit 203. The CPU 101 reads a program stored on the ROM 102 onto the RAM 103 and executes the read program to realize the process illustrated in the flowchart in FIG. 4. Hereinafter, "S" refers to "step".

Step S401 is the processing of acquiring an adjustment target color by the adjustment target color acquisition unit 301 based on image data of a printing target image. If image data is input, the adjustment target color acquisition unit 301 displays the image data on the display unit 105. Further, RGB values that correspond to a user-designated position in the displayed image are transmitted as an adjustment target color to the determination unit 305, and the processing proceeds to step S402.

Step S402 is the processing of determining a sample color by the sample color acquisition unit 302 based on a sample image 902 generated by reading the sample 901. When the adjustment target color is determined, the sample color acquisition unit 302 prompts the user to scan a print material (sample 901) containing the sample color and displays read image data acquired by scanning the sample on the display unit 105. Further, RGB values corresponding to a user-designated position in the displayed image are transmitted as a sample color to the inside/outside-color-reproduction-range determination unit 304, and the processing proceeds to step S403. The RGB values acquired as the sample color correspond to RGB values (hereinafter, "scan_RGB") in the RGB color space dependent on the scanner unit 112. The sample color is defined herein as "target_RGB".

Step S403 is the processing of acquiring table data representing the color reproduction range of the MFP 100 by the range acquisition unit 303. When the sample color is determined, the range acquisition unit 303 selects data representing the color reproduction range of the MFP 100 from the table data stored on the large-capacity storage apparatus 104 and acquires the selected table data. The acquired table data is transmitted to the inside/outside-color-reproduction-range determination unit 304, and the processing proceeds to step S404.

Step S404 is the processing of determining whether the sample color is outside the color reproduction range by the inside/outside-color-reproduction-range determination unit 304. When the sample color target_RGB and the color reproduction range are input, the inside/outside-color-reproduction-range determination unit 304 determines whether the Lab values corresponding to the target_RGB are outside the color reproduction range. The inside/outside-color-reproduction-range determination unit 304 acquires table data for converting RGB of image data read by the scanner unit 112 into Lab from the large-capacity storage apparatus 104. Table 3 shows an example of the color conversion table for color conversion of scan RGB into Lab.

TABLE 3

| Input (scan_RGB) | | | Output | | |
|---|---|---|---|---|---|
| R | G | B | L | a | b |
| 0 | 0 | 0 | 0.0 | 0.0 | 0.0 |
| 0 | 0 | 16 | 0.6 | 5.4 | −17.8 |
| 0 | 0 | 32 | 1.8 | 16.2 | −37.2 |
| 0 | 0 | 48 | 3.3 | 29.6 | −51.3 |
| 0 | 0 | 64 | 5.0 | 39.8 | −62.6 |
| 0 | 0 | 80 | 6.8 | 47.1 | −71.9 |
| 0 | 0 | 96 | 8.9 | 52.2 | −79.5 |
| 0 | 0 | 112 | 10.9 | 56.7 | −86.2 |

Based on the table data for conversion of acquired scan_RGB into Lab, the sample color (target_RGB) represented by RGB values corresponding to the scan_RGB is converted into Lab values. The converted Lab values are defined as "target_Lab". A method for conversion into Lab is not limited to the method that employs the table data. Any method that converts the scan_RGB in the RGB space dependent on the scanner unit 112 into an independent color space used in the color reproduction range can be used, and a method for conversion into Lab values using a publicly-known matrix calculation can be used.

Figure 5:
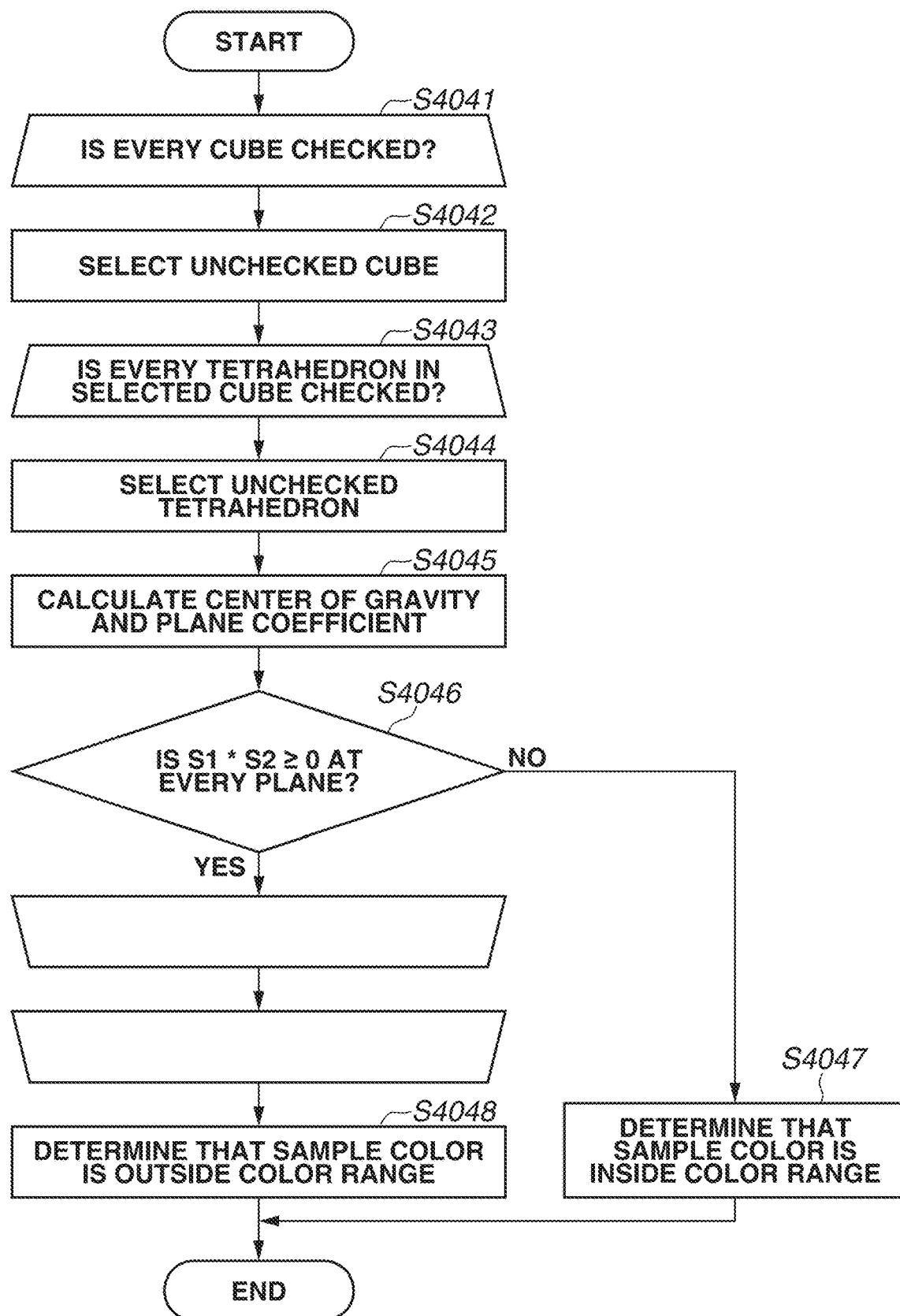
FIG. 5 is a flowchart illustrating a process of an inside/outside-color-reproduction-range determination unit.

The inside/outside-color-reproduction-range determination unit 304 determines whether the target_Lab values are outside the color reproduction range. Details of a process of the determination are illustrated in FIG. 5. In the present exemplary embodiment, the color reproduction range is divided into cubes each consisting of eight neighboring grid points of the table data. Further, whether the target_Lab values are outside the color reproduction range is determined by checking each cube to determine whether the cube contains the target_Lab. The determination of whether the cubes contain the target_Lab is performed using an inside/outside determination method based on the relationship between a center of gravity of a publicly-known polygon and a target point.

Step S4041 is the processing of monitoring whether every cube of the color reproduction range has been checked to determine whether the target_Lab is contained in the cube. In step S4043, a selected cube is divided into six tetrahedrons based on a line segment connecting a grid point having the smallest total value of the signal values RGB and a grid point having the greatest total value of the signal values RGB. Then, whether every tetrahedron has been checked to determine whether the target_Lab is contained in the tetrahedron is monitored. In a case where there is an unchecked cube in step S4041 or there is an unchecked tetrahedron in step S4043, a cube is selected as a determination target in step S4042, and a tetrahedron is selected from the selected cube in step S4044, and steps S4045 and S4046 are repeated.

Steps S4045 and S4046 are repeated until all cubes have been checked or until a cube that contains the target_Lab is identified.

In step S4045, the center of gravity of the tetrahedron and a plane coefficient of each plane are calculated from grid points of the tetrahedron. The center of gravity is calculated by adding around_L values of four grid points together, around_a values of the four grid points together, and around_b values of the four grid points together and then dividing each sum by the number of grid points, as expressed by formula 1.

Center_L=Σaround_L/4;

Center_a=Σaround_a/4; and

Center_b=Σaround_b/4.  (Formula 1)

Center_Lab is Lab values of the center of gravity.

The plane coefficients (A, B, C, and D of formula 2) are calculated using formula 2. A plane equation including three points P1(L1, a1, b1), P2(L2, a2, b2), and P3(L3, a3, b3) that constitute a plane is defined as AL+Ba+Cb+D=0.

$A=(b3-b1)*(a2-a1)-(b2-b1)*(a3-a1);$ $B=(b2-b1)*(L3-L1)-(b3-b1)*(L2-L1);$ $C=(L2-L1)*(a3-a1)-(L3-L1)*(a2-a1);$ and $D=-1.0*(A*L1+B*a1+C*b1).$  (Formula 2)

The plane coefficients ABCD of the four planes of the tetrahedron are calculated based on formula 2.

Next, in step S4046, the positional relationship between the center of gravity Center_Lab of the tetrahedron and the target_Lab is calculated with respect to each plane of the tetrahedron using the plane coefficients ABCD calculated in step S4045. First, s1 and s2 are calculated for each of the four planes using formula 3.

$s1=A*\text{target\_}L+B*\text{target\_}a+C*\text{target\_}b+D;$ and $s2=A*\text{Center\_}L+B*\text{Center\_}a+C*\text{Center\_}b+D.$  (Formula 3)

In a case where the product of s1 and s2 is a negative value, the center of gravity of the tetrahedron and the grid point of interest with respect to one plane of the tetrahedron are at different positions. Specifically, in a case where S1*S2≥0 for all four planes (NO in step S4046), the processing proceeds to step S4047. In step S4047, the determination result (the sample color is inside the reproduction range) that the target_Lab is not outside the color reproduction range is transmitted to the determination unit 305. Further, the cube that is determined as containing the target_Lab is transmitted to the determination unit 305.

In a case where the processing is repeated until all the cubes are checked (YES in step S4046), the processing proceeds to step S4048. In step S4048, the determination result (the sample color is outside the reproduction range) that the target_Lab is outside the color reproduction range is transmitted to the determination unit 305.

Process in the Case Where the Determination Result is "Sample Color is Inside the Reproduction Range"

In the case where the inside/outside-color-reproduction-range determination unit 304 determines that the sample color is inside the reproduction range, the determination unit 305 maps the target_Lab corresponding to the sample color in the Lab color space defined by the color reproduction range and determines a target signal value. In step S405, a Lab value (hereinafter, "calc_Lab") is calculated for each RGB value settable in the range using the color reproduction range shown in Table 1. For example, in the present exemplary embodiment, the RGB values corresponding to the devRGB each have 8 bits and can represent 256 points, so that the calc_Lab is calculated for each of the 256^3 RGB values. Further, the color difference (hereinafter, "dist") between the calcLab and the target_Lab calculated in step S404 is calculated for each of the RGB values using formula 4. In formula 4, sqrt represents a calculation of a square root.

$$\text{dist}=\text{sqrt}((\text{calc\_}L-\text{target\_}L)^2+(\text{calc\_}a-\text{target\_}a)^2+(\text{calc\_}b-\text{target\_}b)^2). \quad \text{(Formula 4)}$$

In step S406, the determination unit 305 identifies the RGB value with the smallest dist value among the 256^3 dist values calculated in step S405. The identified RGB value is determined as a target signal value, and the adjustment target color and the target signal value are transmitted to the color adjustment table output unit 306. By the search for the point with the smallest dist in the Lab color space based on the human visual characteristics as described above, a signal value for reproducing a color recognized as the color closest to the sample color is identified, and the adjustment target color is brought close to the user-desired color.

Process in the Case Where the Determination Result is "Sample Color is Outside the Reproduction Range"

In the case where the inside/outside-color-reproduction-range determination unit 304 determines that the sample color is outside the reproduction range, the MFP 100 cannot accurately reproduce the color recognized as being close to the sample color. Thus, in order to adjust the color to the user-desired color, an alternative color for the sample color is determined within the reproduction range. However, as in the case where the determination result is that the sample color is inside the reproduction range, the method of mapping on a point with the smallest distance from the sample color in the Lab space does not always realize adjustment to the user-desired color, because how much a tone such as brightness, saturation, or hue is to be emphasized changes depending on the shape of the reproduction range and the position of the sample color in the Lab color space, and the tone does not always match the tone that the user desires to emphasize. Similarly, a publicly-known mapping method in which a specific color is mapped within a range in a Lab color space can only limit a tone to be emphasized, and the user needs to set a tone to be emphasized as appropriate. Therefore, it is difficult to automatically identify the user-desired color by mapping processing. Thus, in the present exemplary embodiment, a chart image that contains a plurality of candidate colors with different tones among representable colors is generated, and an alternative color for the sample color is determined by prompting the user to select a color that is close to the user-desired color based on the chart image. Since a color is visually selected by the user based on the candidate colors, adjustment that brings the adjustment target color close to the user-desired color is realized even in the case where the sample color is outside the color reproduction range.

Figure 6:
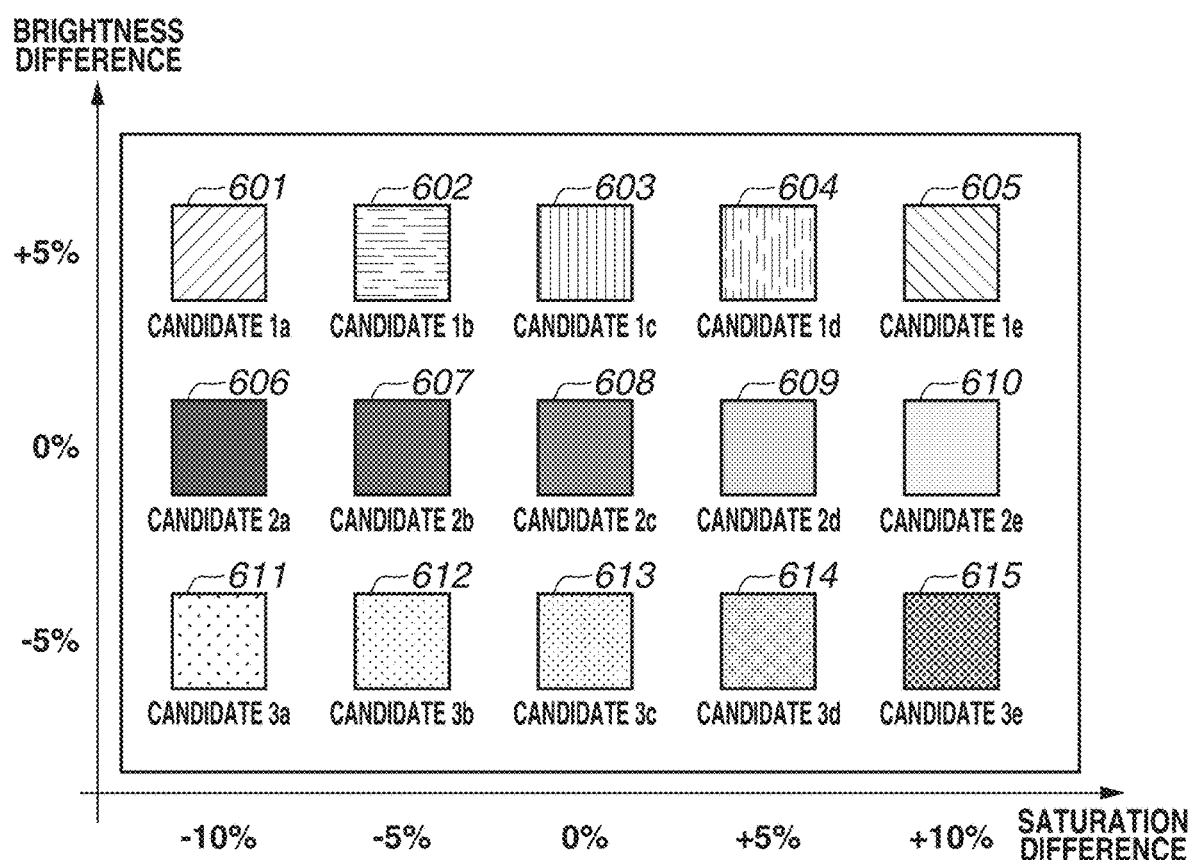
FIG. 6 illustrates an example of a chart image.

If the determination unit 305 receives the notification that the sample color is outside the reproduction range (YES in step S404), in step S407, a chart image that contains a plurality of candidate colors is generated for visual selection by the user. FIG. 6 is a schematic view illustrating the chart image. The chart image is generated to contain patches (601 to 615) of fifteen candidate colors of uniform intervals in Lab values. First, a value org_Lab corresponding to the patch 608, which is the center of the candidate colors in the Lab color space, is calculated. In the present exemplary embodiment, in order to set the org_Lab as the color closest to the sample color in the reproduction range, the processing similar to steps S405 and S406 is performed to calculate a Lab value with the smallest dist. Next, as illustrated in FIG. 6, a Lab value is calculated for each patch so that brightness and saturation are uniform. For example, $L_{high}$, which is the L value of the patches 601 to 605, and $L_{low}$, which is the L value of the patches 611 to 615, are calculated from org_L, a minimum value $L_{min}$ of L, and a maximum value $L_{max}$ of L using formula 5. In formula 5, abs represents a conversion into an absolute value. The L values of the patches 606 to 610 are org_L.

$$L_{high}=\text{org\_}L+\text{abs}(L_{max}-L_{min})\times 5;$$

$$L_{low}=\text{org\_}L-\text{abs}(L_{max}-L_{min})\times 5. \quad \text{(Formula 5)}$$

Similarly, the ab values of the patches 601, 606, and 611 are defined as $a_1b_1$, the ab values of the patches 602, 607, and 612 as $a_2b_2$, the ab values of the patches 604, 609, and 614 as $a_3b_3$, and the ab values of the patches 605, 610, and 615 as $a_4b_4$. The ab values are calculated from org_ab, minimum values $a_{min}b_{min}$ of the ab values, and maximum values $a_{max}b_{max}$ of the ab values using formula 6. In formula 6, abs represents a conversion into an absolute value. A formula for the b values is similar to the formula for the a values, so that description of the b values is omitted. The ab values of the patches 603, 608, and 613 are defined as org_ab.

$$a_1=\text{org\_}a-\text{abs}(a_{max}-a_{min})\times 10;$$

$$a_2=\text{org\_}a-\text{abs}(a_{max}-a_{min})\times 5;$$

$$a_3=\text{org\_}a+\text{abs}(a_{max}-a_{min})\times 5; \text{ and}$$

$$a_4=\text{org\_}a+\text{abs}(a_{max}-a_{min})\times 10 \quad \text{(Formula 6)}$$

In a case where the calculated Lab values are outside the range (L is 0.0 to 100.0, and a and b are −127.0 to 128.0) defined in the present exemplary embodiment, the Lab values are replaced by L=100.0, a=0.0, and b=0.0. When the Lab values of all the patches are calculated, the processing similar to steps S405 and S406 is performed, and the calculated Lab values of the respective patches are converted into devRGB values and a devRGB-based chart image is generated.

When the chart image is generated, the determination unit 305 transmits print image data of the chart image to the printer engine 111 via the control command generation unit 202, and a color image based on the chart image is printed on a recording medium. When the transmission of the print image data is completed, the processing proceeds to step S408. While the chart image that contains fifteen patches of candidate colors with uniform brightness and saturation intervals is described in the present exemplary embodiment, the chart image is not limited to the above-described example. More desirably, the number of patches, intervals, and a tone to be changed are adjustable depending on a knowledge of the user about the colors and the time that can be spent on adjustment.

Figure 7A:
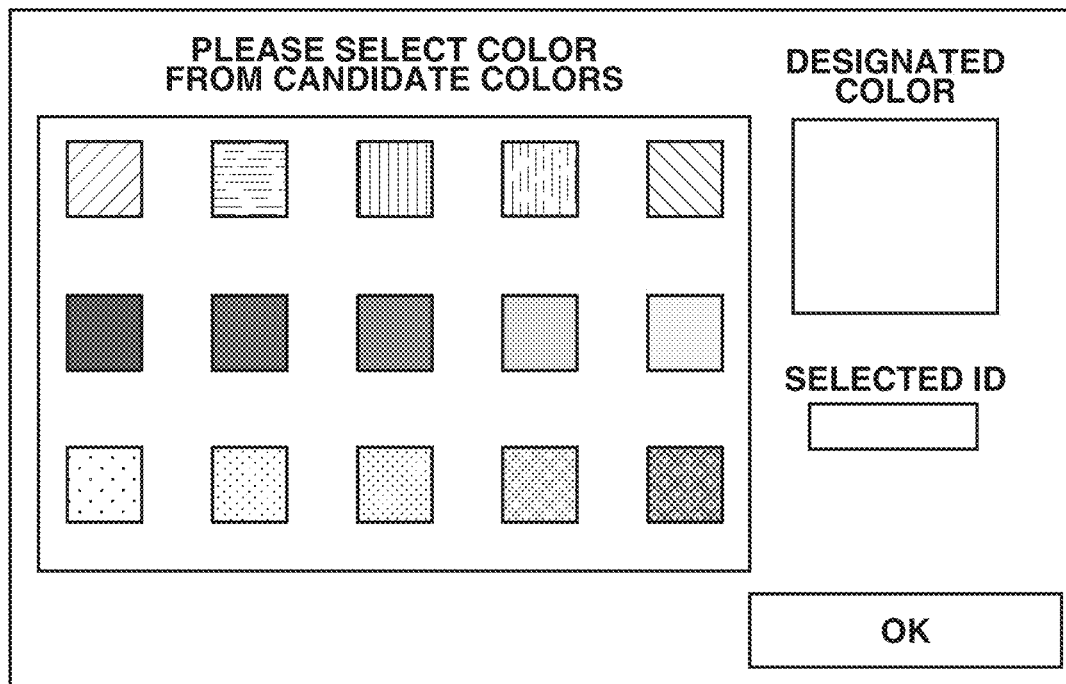
FIG. 7A illustrates an initial state of a user interface (UI) in a case where a user selects a designated color from a chart image.
Figure 7B:
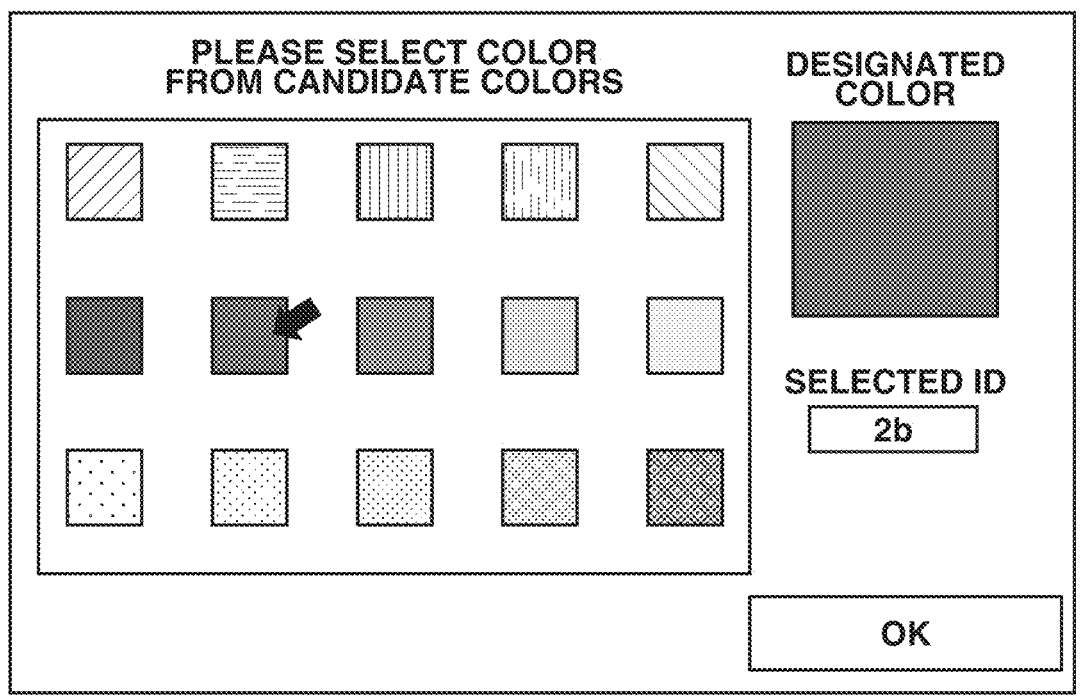
FIG. 7B illustrates a selected state of the UI in the case where the user selects a designated color from the chart image.

In step S408, a user-designated color is identified based on a printed material of the chart image. FIGS. 7A and 7B illustrate images of the display unit 105 from which the user specifies a designated color. The determination unit 305 displays the chart image on the display unit 105 (FIG. 7A). Next, the user selects the color closest to the desired color from the chart image displayed on the display unit 105, and the selected color is determined as the designated color (FIG. 7B). If the designated color is determined, the processing proceeds to step S409.

In step S409, the devRGB corresponding to the patch selected as the designated color in step S408 is acquired from the chart image and determined as a target signal value. If the target signal value is determined, the adjustment target color and the target signal value are transmitted to the color adjustment table output unit 306.

The color adjustment table output unit 306 generates a color adjustment table that associates the adjustment target color and the target signal value that are received. Using the generated color adjustment table, the colors of input image data are converted from sRGB into devRGB so that color adjustment that brings the adjustment target color close to the user-desired color is realized.

The above-described processing enables color adjustment that brings the adjustment target color close to the user-desired color even in the case where the sample color is outside the color reproduction range of the MFP 100.

Modified Example of First Exemplary Embodiment

While the example in which the color adjustment table is generated is described as a desirable example in the present exemplary embodiment, advantages of the present disclosure are not limited to the above-described example. Any method can be employed as long as the conversion of an adjustment target color into a target signal value is possible. For example, if it is possible to add a rule for converting a specific sRGB value in input image data into a devRGB value to an image forming apparatus, the rule for converting an adjustment target color into a target signal value can be added.

In the present exemplary embodiment, the example in which image data that is a color adjustment target is displayed on the display unit 105 and a color corresponding to a user-designated position is determined as an adjustment target color is described. A method for acquiring an adjustment target color is not limited to the above-described method. Any method by which an adjustment target color is acquired can be employed. For example, in a case where information for identifying an object in an image is recorded in information (α-channel) other than colors contained in input image data, an object that contains the adjustment target color can be designated instead of the position of an adjustment target color in the input image data. Further, in a case of binary image data, a color of an area where a color material is recorded can be acquired as an adjustment target color without user designation.

In the present exemplary embodiment, whether a sample color is outside the color reproduction range is determined by checking every tetrahedron in the color reproduction range to determine whether the sample color is contained in the tetrahedron. A determination method is not limited to the above-described example. Any method can be employed for determining whether a sample color is contained in a color space defined by the color reproduction range, and a reverse table (Lab-to-devRGB conversion table) of a devRGB-to-Lab conversion table can be generated and checked for whether Lab values of candidate patches can be converted into devRGB values.

In the present exemplary embodiment, the chart image containing the plurality of candidate colors is generated using the color with the smallest color difference from the sample color among the colors in the color reproduction range as the org_Lab. A method for determining a reference color of candidate colors is not limited to the above-described example. Any method by which a candidate color close to a user-desired color is included in a chart image can be employed and, for example, a Lab value that corresponds to an adjustment target color that can be calculated using Tables 1 and 2 can be determined as the org_Lab. Further, an intermediate value between two Lab values can be determined as the org_Lab based on the target_Lab and the Lab value corresponding to the adjustment target color.

In the present exemplary embodiment, the example in which the color range in the Lab space reproducible by the MFP 100 is used as the range is described. The color range in the present disclosure is not limited to the above-described example. The range can be any range based on which the user can determine whether visual adjustment is necessary. For example, in a case where a reduced number of adjustment man-hours is prioritized over the matching to the user-desired color, a color range containing the color reproduction range and being wider than the color reproduction range can be determined as a predetermined color range, and adjustment can be performed using the color range to reduce the possibility of visual adjustment. On the other hand, in a case where the matching to the user-desired color is prioritized, adjustment can be performed using a narrower color range than the color reproduction range to increase the possibility of visual adjustment.

Figure 10:
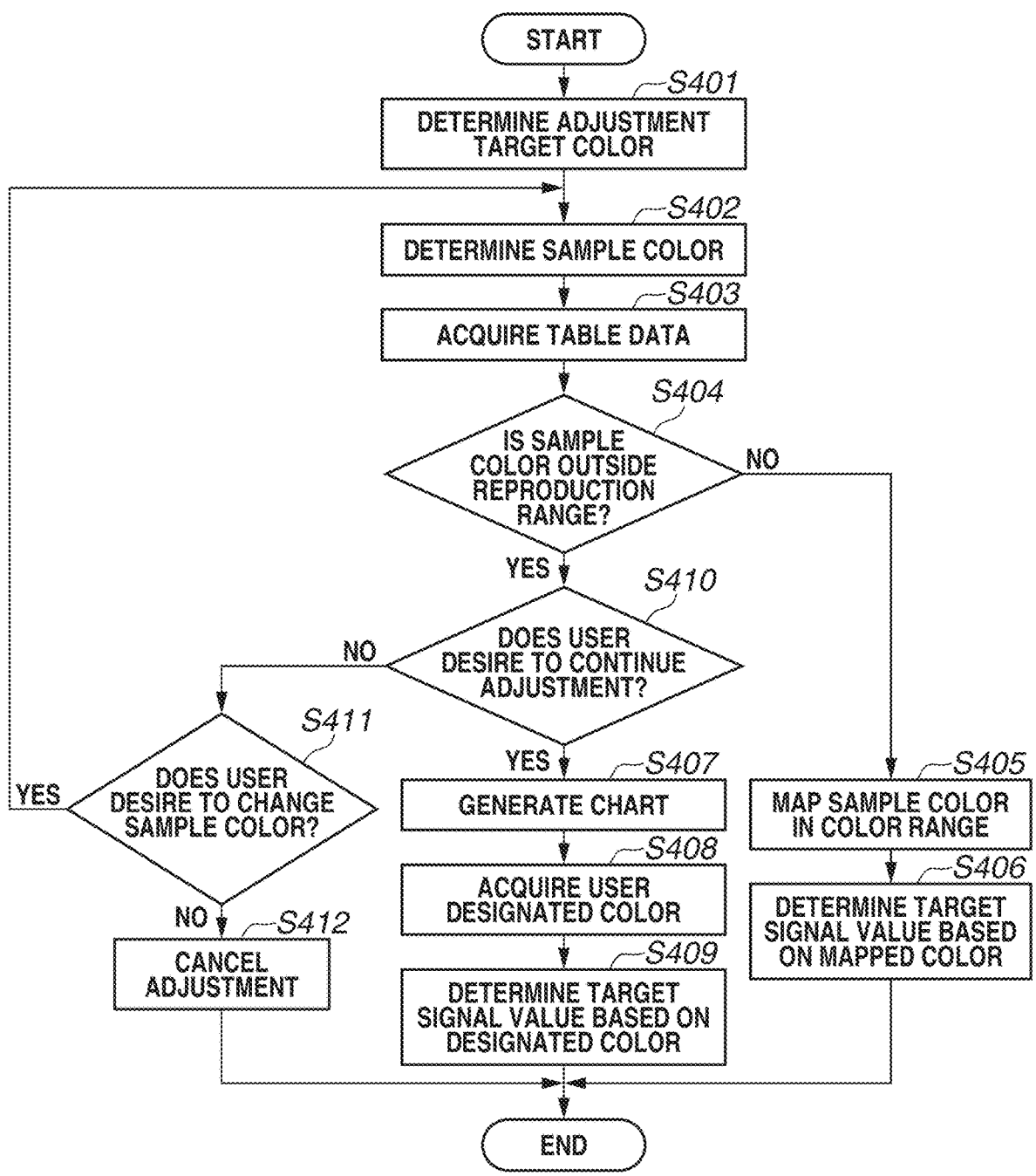
FIG. 10 is a flowchart of a color adjustment table generation unit according to a second exemplary embodiment.

A difference between a process by the image processing apparatus 114 according to a second exemplary embodiment and that according to the first exemplary embodiment will be described below. In the first exemplary embodiment, the example in which the determination unit 305 generates a chart image in the case where the inside/outside-color-reproduction-range determination unit 304 determines that the sample color is outside the reproduction range is described. In the present exemplary embodiment, the processing of displaying a notification indicating that the sample color is outside the reproduction range on the display unit 105 and prompting the user to determine whether to continue the color adjustment is performed before the processing of generating a chart image. With the determination processing, an extra adjustment operation that is necessitated by the absence of the user-desired color in the plurality of candidate colors is reduced. FIG. 10 is a flowchart illustrating a process by the color adjustment table generation unit 203 according to the present exemplary embodiment. The determination processing by the user (steps S410 to S412) is the only difference between the first and second exemplary embodiments, so that description of the other processing is omitted.

Figure 8:
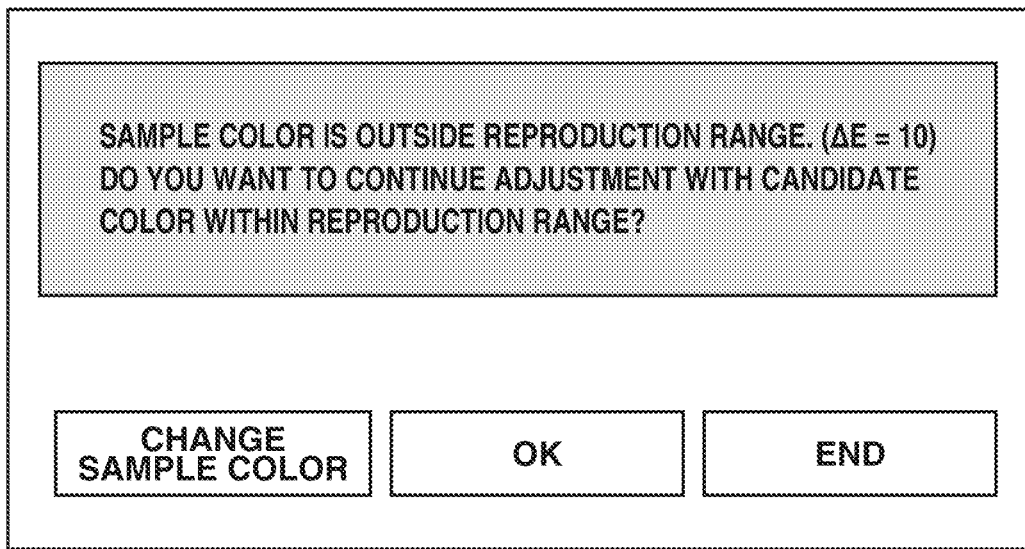
FIG. 8 illustrates an example of a UI that displays a determination result according to a second exemplary embodiment.

In step S410, in the case where the inside/outside-color-reproduction-range determination unit 304 determines that the sample color is outside the reproduction range, a notification that the sample color is outside the reproduction range is displayed on the display unit 105. FIG. 8 illustrates an image of the display unit 105. The notification that the sample color is outside the reproduction range is presented to the user as illustrated in FIG. 8 to prompt the user to select one of items 801 to 803. In a case where the item 801 is selected (YES in step S411), the processing returns to step S402, and the process is performed again from the sample color acquisition. In a case where the item 802 is selected (YES in step S410), the processing proceeds to step S407, and a process similar to that in the first exemplary embodiment is performed. In a case where the item 803 is selected (NO in step S411), the processing proceeds to step S412, and the color adjustment processing is cancelled. It is desirable to quantitatively specify an amount by which the sample color is separated from the color reproduction range, e.g., a color difference (ΔE) in FIG. 8, in addition to the notification that the sample color is outside the reproduction range.

With the above-described processing, whether the user desires to continue the adjustment is checked in the case where the determination result is that the sample color is outside the reproduction range so that an extra adjustment operation that is necessitated by the absence of the user-desired color in the plurality of candidate colors is reduced.

Figure 11:
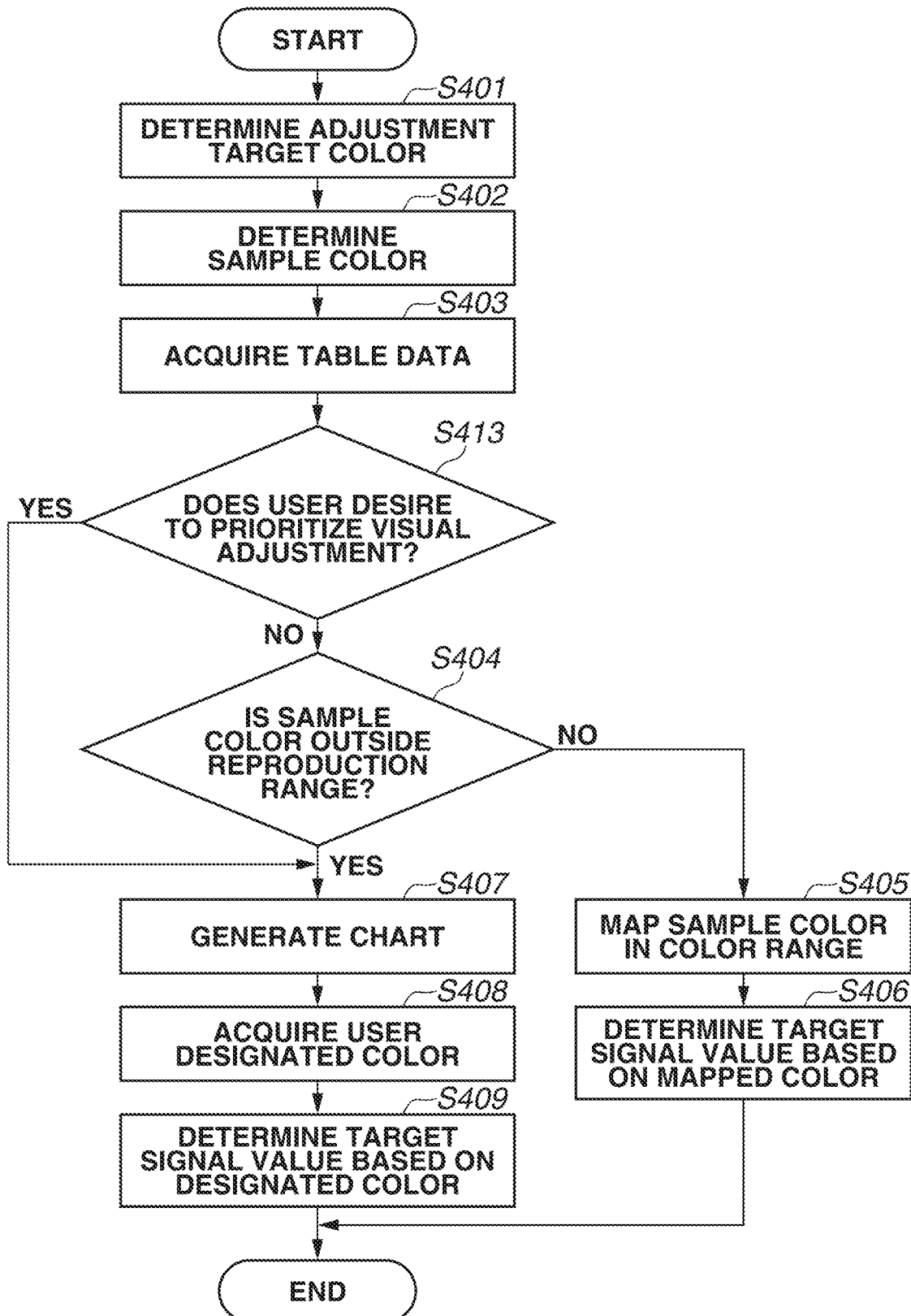
FIG. 11 is a flowchart of a color adjustment table generation unit according to a third exemplary embodiment.

A difference between a process by the image processing apparatus 114 according to a third exemplary embodiment and those according to the first and second exemplary embodiments will be described below. In the first and second exemplary embodiments, the example in which the determination result of the inside/outside-color-reproduction-range determination unit 304 is based on whether the sample color is outside the color reproduction range is described. In the present exemplary embodiment, in addition to the determination of whether the sample color is outside the color reproduction range, a determination of whether the user desires to perform visual adjustment is added as a determination condition. By including the desire of the user in the determination condition, the level of match to the user-desired color improves although the adjustment man-hours may increase. FIG. 11 is a flowchart illustrating a process by the color adjustment table generation unit 203 according to the present exemplary embodiment. Steps S402 and S413 that are different from those in the first and second exemplary embodiments will be described below, and description of the rest of the process is omitted.

Figure 12:
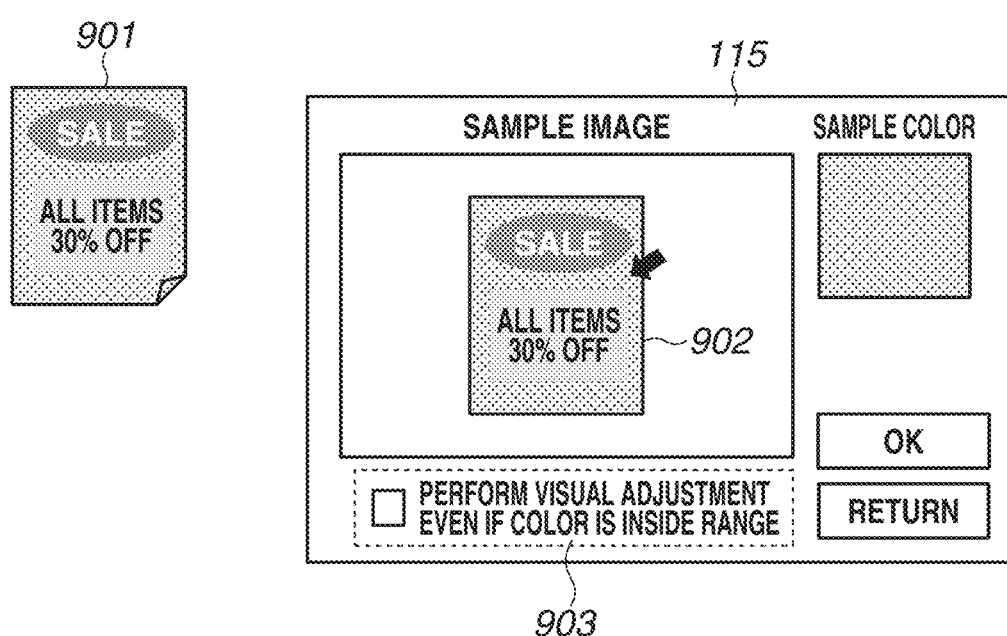
FIG. 12 illustrates an example of a UI via which a sample color acquisition unit according to the third exemplary embodiment determines the sample color and whether to prioritize visual adjustment is selected.

Step S402 is the processing of determining a sample color and determining whether the user desires to prioritize visual adjustment by the sample color acquisition unit 302. FIG. 12 illustrates an example of the display unit 105 according to the present exemplary embodiment. In the present exemplary embodiment, a sample color is acquired as in step S402 in the first and second exemplary embodiments, and whether the user desires to prioritize visual adjustment is determined as specified by a checkbox 903 in FIG. 12. For example, in a case where the checkbox 903 is checked, it is determined that the user desires to prioritize visual adjustment, and the determination result is transmitted to the inside/outside-color-reproduction-range determination unit 304. When the sample color is determined and the user determination is acquired, the processing proceeds to step S403.

Next, in step S413, the inside/outside-color-reproduction-range determination unit 304 determines whether to generate a chart image based on the notification of the determination result as to whether the user desires to prioritize visual adjustment. In a case where the user desires to prioritize visual adjustment (YES in step S413), the processing proceeds to step S407 regardless of the relationship between the sample color and the color reproduction range, and visual color adjustment based on the chart image is performed. On the other hand, in a case where the user does not desire to prioritize visual adjustment (NO in step S413), the processing proceeds to step S404, and the determination processing is performed.

The above-described processing enables implementation of the color adjustment that prioritizes the level of match to the user-desired color over the adjustment man-hours.

While the example in which the user desires to prioritize visual adjustment and a chart image is always generated is described in the present exemplary embodiment, user-settable priority items are not limited to the above-described example. The user can desire to reduce the adjustment man-hours and can determine whether to prioritize the processing of determining a target signal value by mapping processing as a priority item. For example, in a case where the user desires to prioritize the mapping processing, the processing proceeds to step S405 regardless of the relationship between the sample color and the color reproduction range. On the other hand, in a case where the user does not desire to prioritize the mapping processing, the processing proceeds to step S404.

Other Exemplary Embodiments

While table data is stored on the large-capacity storage apparatus 104 and the stored table data is acquired during processing in the first to third exemplary embodiments, a table data acquisition method is not limited to the above-described method. For example, table data input by the user via the host PC 115 can be acquired, or table data can be acquired via the network 113 and the network I/F 108.

The present disclosure is realized also by a process in which a program for realizing one or more functions of the above-described exemplary embodiments is supplied to a system or apparatus via a network or storage medium and one or more processors of a computer of the system or apparatus reads and executes the program. Further, the present disclosure is realized also by a circuit (e.g., application-specific integrated circuit (ASIC)) that realizes one or more functions.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

An adjustment target color is brought close to a user-desired color even in a case where a sample color is outside a color reproduction range of an image forming apparatus.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

What is claimed is:

1. An image forming apparatus comprising:
a display;
a scanner that scans a document to generate image data;
a printer that prints an image; and
a controller that receives selection of a color by a user from one or more colors included in an image of first image data,
wherein the controller acquires a sample color from one or more colors included in second image data generated by scan of a sample document by the scanner;
wherein the controller causes the printer to print an image including a plurality of colors close to the sample color and to cause the display to display the plurality of colors selectable by the user, and
wherein the controller performs a conversion process in order for the printer to print the image of the first image data with a color selected by the user from the displayed plurality of colors instead of the color selected from the one or more colors included in the image of the first image data.

2. The image forming apparatus according to claim 1, wherein the controller causes the printer to print the image including the plurality of colors close to the sample color that is an outside of a color reproduction range of the printer and to cause the display to display the plurality of colors selectable by the user.

3. The image forming apparatus according to claim 1, wherein the controller causes the printer to print the image including the plurality of colors close to the sample color that is an outside a predetermined color range and to cause the display to display the plurality of colors selectable by the user.

4. The image forming apparatus according to claim 1, wherein the controller receives selection of the color by the user from the one or more colors included in the image of the first image data generated by scan of a document by the scanner.

5. The image forming apparatus according to claim 1, wherein the controller acquires the sample color based on a user instruction for selecting a color from a sample image of the second image data displayed on the display.

6. The image forming apparatus according to claim 1, wherein, by performing the conversion process, an RGB value of the first image data is converted to another RGB value.

7. An image forming method comprising:
scanning a document to generate image data;
receiving selection of a color by a user from one or more colors included in an image of first image data;
acquiring a sample color from one or more colors included in second image data generated by scanning a sample document;
causing a printer to print an image including a plurality of colors close to the sample color;
causing a display to display the plurality of colors selectable by a user; and
performing a conversion process in order for the printer to print the image of the first image data with a color selected by the user from the displayed plurality of colors instead of the color selected from the one or more colors included in the image of the first image data.

8. The image forming method according to claim 7, wherein the sample color is an outside of a color reproduction range of the printer.

9. The image forming method according to claim 7, wherein the sample color is an outside of a predetermined color range.

10. The image forming method according to claim 7, wherein the first image data is image data generated by scanning a document.

11. The image forming method according to claim 7, wherein the sample color is acquired based on a user instruction for selecting a color from a sample image of the second image data displayed on the display.

12. The image forming method according to claim 7, wherein, by performing the conversion process, an RGB value of the first image data is converted to another RGB value.

* * * * *